June 26, 1962   H. E. LANTERY   3,040,937
MEASURING DISPENSER
Filed Jan. 28, 1960   2 Sheets-Sheet 1
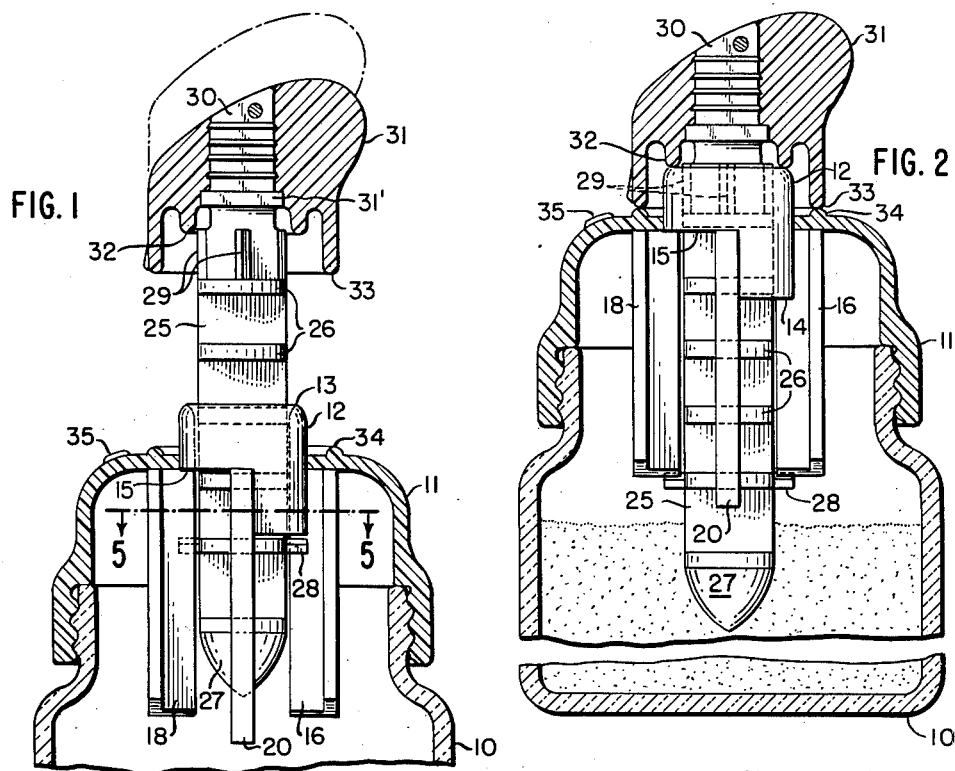
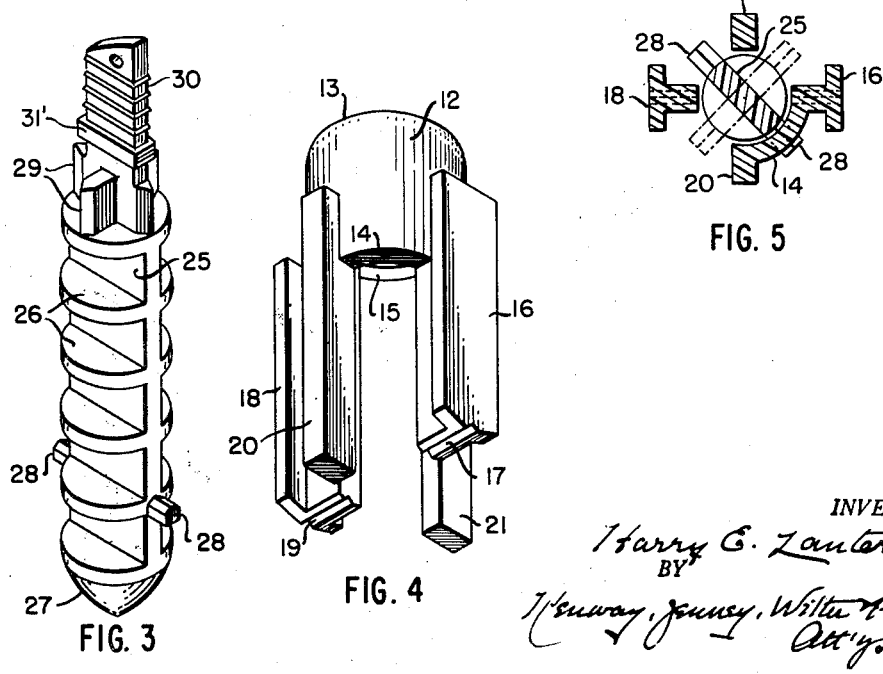
INVENTOR.
Harry E. Lantery
BY
Kenway, Jenney, Witter & Hildreth
Attys.

June 26, 1962 H. E. LANTERY 3,040,937
MEASURING DISPENSER

Filed Jan. 28, 1960 2 Sheets-Sheet 2

INVENTOR.
Harry E. Lantery
BY
Kenway, Jenney, Witter & Hildreth
Att'ys.

United States Patent Office 3,040,937
Patented June 26, 1962

3,040,937
MEASURING DISPENSER
Harry E. Lantery, 332 Billings Road, Wollaston, Mass.
Filed Jan. 28, 1960, Ser. No. 5,241
8 Claims. (Cl. 222—284)

This invention comprises a new and improved dispenser attachable to a commercial bottle or can for coffee and the like, and serviceable for segregating from bulk and delivering a measured charge of the quantity desired by the user.

While the dispenser of my invention is of general utility for dispensing any powdered or granular commodity, it is particularly adapted for the use of such connoisseurs as desire the assurance of an accurately measured quantity or a charge of instant coffee for each cup as well as an opportunity to vary the charge by different increments or decrements. To this end my improved distributor comprises a cap to which is attached a concentric plunger guide having stepped gauge faces at different levels in combination with a plunger slidable through the cap within the guide and carrying longitudinally spaced compartments and separate abutments cooperating with the gauge faces of the plunger guide. The abutments and gauge faces are so arranged as positively to determine the delivery movement of the plunger in accordance with its rotary position within the guide. That is to say, in one position the plunger may be moved outwardly to clear one or two of its compartments above the cap and in another rotary position it may be moved out a further distance to clear three or more compartments each carrying an aliquot portion of the charge.

It has been found that powdered coffee has a tendency to become somewhat viscous when exposed to dampness, and so to cause sticking of movable dispenser parts. I have solved this problem by providing the cap and plunger with coperating sealing ribs or rings that are arranged to make line contact thus eliminating any substantial area that might otherwise stick and interfere with the free movement of the plunger. At the same time, the sealing rings safeguard the commercial container against the entrance of moisture that might agglomerate its contents.

These and other features of the invention will be best understood and appreciated from the following description of a preferred embodiment thereof, selected for purposes of illustration and shown in the accompanying drawings in which, FIG. 1 is a view of the dispenser in elevation partly in longitudinal section showing the plunger in one of its discharging positions.

FIG. 2 is a similar view showing the plunger in its inner or closed condition.

FIG. 3 is a view in perspective of the plunger.

FIG. 4 is a view in perspective of the plunger guide, and

FIG. 5 is a fragmentary view in cross-section of the line 5—5 of FIG. 1.

Figure 6:
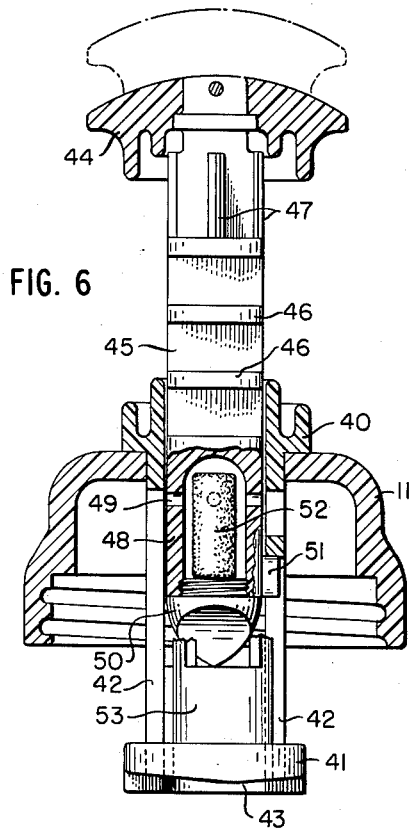
FIGS. 6 and 7 are longitudinal sectional views of a modified form of my invention.
Figure 7:
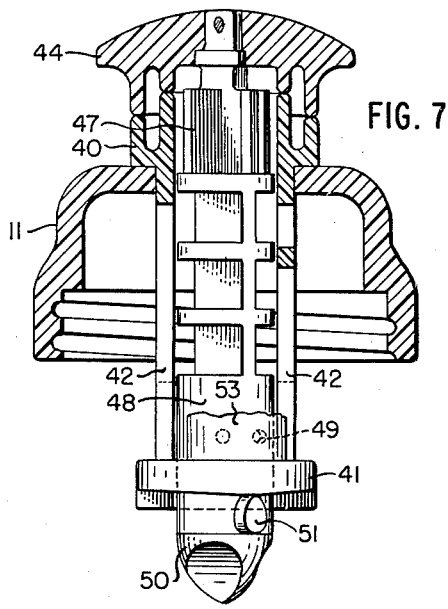
Figure 8:
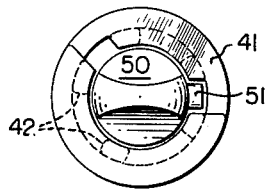
FIG. 8 is a bottom view corresponding to FIG. 6.
Figure 9:
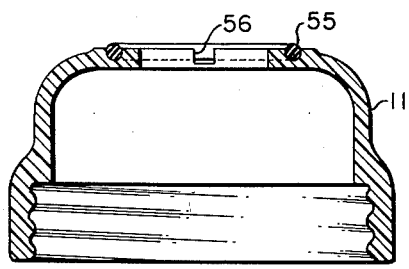
FIG. 9 is a sectional view of a modified cap.

In the drawings, a commercial container for instant coffee or the like, is shown in the form of a glass screw-top jar 10 such as usually comes to the customer sealed with a threaded metal cap. The dispenser of my invention is organized upon a cap 11, internally threaded to fit the container 10 and provided in its upper surface with a circular aperture for the reception of the plunger guide which includes in its structure a cylindrical head 12. This head is fitted into the aperture of the cap and permanently attached thereto. The upper rim of the head 12 is tapered to form line contact with a corresponding ring on the plunger head 31 which will be described more fully hereinafter.

The head 12 of the guide has a lower stop or gauge face 14 and an upper stop or gauge face 15, both extending radially and directed downwardly. These faces act selectively to arrest the plunger in correspondingly different discharge positions as will be presently explained. The head 12 carries a pair of diametrically opposed locking bars 16 and 18 and these are provided in their lower end faces with locking notches 17 and 19. The head 12 also carries a pair of downwardly extending guide bars 20 and 21 also diametrically disposed and located substantially half way between the locking bars 16 and 18.

The plunger, as best shown in FIG. 3, comprises a flat central bar 25 which carries a series of spaced shelves or partitions 26 of circular contour forming five compartments on each side of each bar 25. The plunger terminates at its lower end in a conical head 27 and at the level of the first intermediate partition 26 is provided a pair of outwardly extending arms or lugs 28 arranged either to register with the locking notches 17 and 19 when the plunger is in its closed position as shown in FIG. 2 or to engage one or other stop faces 14 or 15 when the plunger is withdrawn for dispensing its charge.

It will be understood that the circular partitions 26 make a close sliding fit within the bore of the head 12 of the plunger guide. Above the uppermost partition, the plunger is provided with radial ribs 29 which not only reinforce the plunger as a whole but serve to guide it in its initial longitudinal movement in the cylindrical head 12. At its upper end, the plunger is provided with a stem 30 having a series of transverse ribs arranged to interlock with corresponding shallow grooves in an operating head 31 which is thus permanently secured to the upper end of the plunger. The lower end of the head 31 is circular in contour and provided with an inner ring 32 arranged to make contact with the tapering rim 13 of the plunger guide. The head also has an outer concentric ring 33 arranged to make line contact with an upwardly projecting circular rib 34 formed in the body of the cap 11. When the plunger is in its closed position the rings 32 and 33 make a line sealed contact with the rim 13 and rib 34 thus providing a double seal against moisture through the medium of line contact which obviates all danger of troublesome cohesion between the elements of the double seal thus provided. The head 31 is provided with an index point which cooperates with indicating points 35 on the cap 11 that show the rotary position of the plunger.

The stem 30 has at its lower end a circular flange 31' that forms a seal with the body of the head 31 so that no moisture can work down the stem and gum the contacting surfaces beneath the head.

When the plunger is in its lowermost or closed position, as shown in FIG. 2, the projecting lugs 28 snap into the locking notches 17 and 19 which are formed in the lower end faces of the locking bars 16 and 18. The plunger is thus yieldingly locked with its uppermost partition 26 closing the bore of the head 12 and the container is further double-sealed by the rings 32 and 33 of the head 31. The locking lugs 28 may be disengaged from their notches by applying moderate twisting force to the head 31.

When the user desires to secure a measured charge of coffee or the like the container 10 is inverted and since the plunger guide is in effect an open cage all compartments of the plunger will be filled with coffee. The plunger may then be rotated as above explained, releasing the locking lugs 28 from their notches and bringing one of them into alignment with the lower stop face 14 of the head 12, as suggested in FIG. 5. In this position, the plunger may be withdrawn carrying with it the contents of its outer two compartments formed by partitions 26, and since the body 25 of the plunger is in the form of a flat plate or bar the withdrawn contents of the compartments will fall freely into any waiting cup or pot. If it is desired to dispense a larger charge, the plunger may be rotated to bring the lugs 28 into dotted line position shown in FIG. 5 and into line with the upper stop face 15 of the head 12. When rotated to this position, the plunger may be withdrawn to discharge three instead of two of its compartments. In the illustrated embodiment of the invention, two positive stops are shown for determining accurately two different discharge positions of the plunger but it will be apparent that more discharge stations could be arranged if so desired and also that charges equivalent to the contents of four or five compartments may be discharged by operating the plunger twice with the proper setting.

In FIGS. 6-9 is shown a modified form of dispenser equipped with means for adding an essence or flavoring component to the distributed charge.

In this modification the cap 11 carries a plunger guide comprising a flanged collar 40, a bottom ring 41 and a series of five spaced vertical guide bars 42. This guide is permanently secured in place within the cap 11. The lower circular face of the ring 41 is given a cam formation 43.

The plunger comprises a handle or knob 44 which is secured to the top of the plunger body 45, herein shown as provided with spaced shelves 46 defining the spaces for three measured charges of coffee or the like. The lower end of the plunger is formed as a cylindrical chamber 48 having outlet ports 49. The chamber 48 terminates in a removable cone 50 and is herein shown as containing a cartridge or pellet 52 which may be coffee essence or other condiment useful in imparting flavor to the beverage being prepared. In initial position, the ports 49 are masked by a circular wall 53 which is a part of the plunger guide structure. When the plunger is raised to its discharge position, as shown in FIG. 6, the ports are uncovered.

The plunger is provided beneath the knob 44 with radial ribs 47 that serve to guide the plunger in its movement in the guide and also wipe from the walls of the guide any accumulation of the product being handled. The handle itself is provided with circular ribs downwardly extending and making a double seal with corresponding flanges on the head of the plunger guide collar 40. As suggested in FIG. 9, an O-ring 55 may be substituted for one or more of these flanges, and may be mounted in a groove formed concentrically about the aperture of the cap 11. The groove is semicircular in cross section and engages more than 180° of a section of the O-ring. The O-ring is snapped into place by pressing it into the groove and may be conveniently removed by inserting a narrow or pointed utensil into a recess 56 and lifting it free.

The condiment chamber 48 of the plunger is herein shown as having a pin 51 which cooperates with the cam surface 43 of the plunger ring in drawing the plunger down forcibly to its initial sealing position.

The partitions 26 and 46 are so located and spaced that as the plunger is moved outwardly in its guide there will be at all times a partition in the head thus preventing free passage of the contents of the container at any position of plunger travel.

The residual ribs 29 or 47 may be tapered outwardly so as to make line contact with the bore of the head in which they move and insure free sliding of the plunger.

The dispenser herein shown may be attractively constructed in whole or in part of transparent or translucent vinylite or other synthetic resinous compound thus not only being of pleasing appearance but permitting the user to inspect the moving parts in the dispensing operation.

Having thus disclosed my invention and described in detail illustrative embodiments thereof, I claim as new and desire to secure by Letters Patent:

1. A measuring dispenser attachable to a commercial container of coffee or the like, comprising a cap having in its upper surface a circular aperture and a concentric sealing rib, a concentric plunger guide secured within the cap and including a cylindrical head carrying a pair of downwardly extending guide bars, and a pair of downwardly extending locking bars and having stepped gauge faces at different levels, in combination with a plunger slidable through and rotatable in the aperture of the cap and carrying spaced transverse shelves, abutments cooperating with selected ones of the gauge faces and the locking bars of the plunger guide in selected longitudinal and rotational positions of said plunger therein, and an operating head having a sealing ring arranged to engage the sealing rib of the cap.

2. A measuring dispenser as defined in claim 1 further characterized in that the sealing rib of the cap and the sealing ring of the operating head are rounded to make line contact.

3. A measuring dispenser as defined in claim 1 further characterized in that the cap and operating head are provided with two sets of meeting sealing rings arranged concentrically, one within the other.

4. A measuring dispenser attachable to a commercial container for coffee or the like, comprising an apertured cap, an inwardly extending plunger guide having radially projecting stop faces longitudinally and circumferentially spaced therein, in combination with a plunger rotatably and longitudinally movable in the guide and having a longitudinal series of compartment-forming shelves circular in contour fitting the aperture of the cap and radially projecting lugs for engaging selected stop faces of the plunger guide in selected rotational positions of said plunger therein and so govern the discharging positions of the plunger, the body of the plunger comprising a flat bar.

5. A measuring dispenser as defined in claim 4, further characterized in that the plunger guide is of cage-like form having spaced longitudinal guide bars freely admitting coffee to the compartments of the plunger.

6. A measuring dispenser attachable to a commercial container for coffee or the like, comprising a cap shaped to fit such a container and having a concentric open aperture therein, a hollow cylindrical head fast in the aperture of the cap and having radially projecting stop faces downwardly directed at different levels and at different circumferential positions within the cap, together with a plunger slidable and rotatable within the said head and having a longitudinal series of compartments, said plunger having radial stop lugs adapted to engage selected ones of the stop faces of the head in selected rotational positions of said plunger therein, the compartments of the plunger being formed by spaced circular partitions that have sliding fit within the bore of the hollow cylindrical head, whereby each partition successively seals the head as the plunger is withdrawn.

7. A measuring dispenser attachable to a commercial container for coffee or the like, comprising an inwardly extending plunger guide having radially disposed stop faces longitudinally and circumferentially spaced therein, in combination with a plunger rotatably and longitudinally movable in the guide and having a longitudinal series of compartment-forming shelves and radially projecting lugs for engaging selected stop faces of the plunger guide in selected rotational positions of said plunger therein and governing the discharging position of the plunger, the plunger guide being formed with a sealing wall at its inner end, and the plunger being formed with a condiment chamber having ports sealed by said wall in the position of said plunger closing the dispenser, and unsealed when the plunger is moved to a discharging position.

8. A measuring dispenser attachable to a commercial container for condiments, comprising an apertured cap, an inwardly extending plunger guide having radially projecting stop faces longitudinally and circumferentially spaced therein, in combination with a plunger rotatably and longitudinally movable in the guide and having a series of compartment-forming shelves and radially projecting lugs for engaging selected stop faces of the plunger guide, the plunger being formed with a ported condiment chamber, together with means for sealing the ports of the chamber of the plunger in the plunger guide.

References Cited in the file of this patent

UNITED STATES PATENTS

| | | |
|---|---|---|
| 734,394 | Arneson | July 21, 1903 |
| 2,357,387 | Dudley | Sept. 5, 1944 |
| 2,792,160 | Jones et al. | May 14, 1957 |